(12) United States Patent
Ndebele et al.

(10) Patent No.: US 10,677,284 B2
(45) Date of Patent: Jun. 9, 2020

(54) BALL JOINT WITH A RETAINER/SAFETY NUT THAT PREVENTS ACCIDENTAL SEPARATION OF THE BALL STUD AND THE SOCKET

(71) Applicant: Paul Ndebele, Harare (ZW)

(72) Inventors: Paul Ndebele, Harare (ZW); Sharon Ndebele, Harare (ZW); Sheila Mashiri, Harare (ZW)

( * ) Notice: Subject to any disclaimer, the term of this patent is extended or adjusted under 35 U.S.C. 154(b) by 175 days.

(21) Appl. No.: 15/567,977

(22) PCT Filed: Apr. 24, 2015

(86) PCT No.: PCT/IB2015/053008
§ 371 (c)(1),
(2) Date: Oct. 20, 2017

(87) PCT Pub. No.: WO2016/170400
PCT Pub. Date: Oct. 27, 2016

(65) Prior Publication Data
US 2018/0119730 A1  May 3, 2018

(51) Int. Cl.
*F16C 11/06* (2006.01)
*B60G 7/00* (2006.01)
*B62D 7/16* (2006.01)

(52) U.S. Cl.
CPC ........ *F16C 11/069* (2013.01); *F16C 11/0604* (2013.01); *F16C 11/0614* (2013.01);
(Continued)

(58) Field of Classification Search
CPC .... B60G 7/005; B60G 2204/416; B62D 7/16; F16C 11/0609; F16C 11/0614;
(Continued)

(56) References Cited

U.S. PATENT DOCUMENTS 1,616,325 A   2/1927  Minster
2,396,151 A * 3/1946  Brenner .............. F16C 11/0628
                                                    403/75
(Continued)

FOREIGN PATENT DOCUMENTS

AT      32735 B    4/1908
DE    8137469 U1   5/1982
(Continued)

*Primary Examiner* — Josh Skroupa
(74) *Attorney, Agent, or Firm* — Patshegen IP LLC; Moshe Pinchas

(57) ABSTRACT

A device for avoiding the accidental separation of ball and socket in a ball joint assembly and preventing steering and mechanical loss of control on motor vehicles. The device includes a ball joint assembly having a screw-in type socket; provided with a first a second openings and a polymer bearing fitted inside the socket; a ball disposed in the socket such that the polymer bearing absorbs impact exerted on the ball, the ball having a first and second studs coupled thereto, the first stud protruding from the first opening, and the second stud protruding from the second opening the first and second studs includes a safety hole and cotter pin. The device further includes a bell-shaped retainer coupled to the second stud and having a wide portion larger than the second opening precluding thereby displacement of the ball out of the socket.

5 Claims, 2 Drawing Sheets

(52) U.S. Cl.
CPC .......... *F16C 11/0666* (2013.01); *B60G 7/005* (2013.01); *B60G 2204/416* (2013.01); *B62D 7/16* (2013.01); *F16C 2326/05* (2013.01); *F16C 2326/24* (2013.01); *Y10T 403/32811* (2015.01)

(58) Field of Classification Search
CPC .............. F16C 11/0623; F16C 11/0628; F16C 11/0642; F16C 11/0647; F16C 11/0666; F16C 11/0671; F16C 11/068; F16C 11/069; F16C 11/0695; F16C 11/083; F16C 11/086; F16C 2326/05; F16C 2326/24; Y10T 403/32204; Y10T 403/32713; Y10T 403/32737; Y10T 403/32762; Y10T 403/32811; Y10T 403/32852

USPC .................. 403/77, 132, 135, 138, 144, 149
See application file for complete search history.

(56) References Cited

U.S. PATENT DOCUMENTS

| | | | | |
|---|---|---|---|---|
| 2,444,121 | A | | 6/1948 | Venditty |
| 2,718,418 | A | * | 9/1955 | Latzen ................ F16C 11/0628 403/137 |
| 4,162,859 | A | * | 7/1979 | McAfee .............. F16C 11/0619 403/77 |
| 4,613,250 | A | * | 9/1986 | Laucus ............... F16C 11/0619 403/138 |
| 5,672,023 | A | | 9/1997 | Lieber |
| 5,882,137 | A | | 3/1999 | Epp |
| 6,257,795 | B1 | * | 7/2001 | Stroh ....................... B62D 7/16 403/135 |
| 8,794,860 | B1 | * | 8/2014 | McGean ............. F16C 11/0642 403/137 |
| 9,291,195 | B1 | * | 3/2016 | Parker ................ F16C 11/0628 |
| 9,518,602 | B2 | * | 12/2016 | Forthaus ............. F16C 11/0623 |
| 9,643,645 | B2 | * | 5/2017 | Dendis .................... B62D 7/18 |

FOREIGN PATENT DOCUMENTS

| | | | |
|---|---|---|---|
| EP | 0884489 A2 | 12/1998 | |
| GB | 540712 A * | 10/1941 | .......... F16C 11/0619 |
| GB | 623506 A | 5/1949 | |
| GB | 1092278 A | 11/1967 | |
| WO | 2006/110049 A2 | 10/2006 | |

* cited by examiner

BALL JOINT WITH A RETAINER/SAFETY NUT THAT PREVENTS ACCIDENTAL SEPARATION OF THE BALL STUD AND THE SOCKET

BACKGROUND OF THE INVENTION

This invention relates in general to ball joints, such as are commonly used in vehicular steering and suspension applications to transmit force between a steering mechanism and a steered wheel of a vehicle. In particular, this invention is aimed at avoiding accidental separation of the ball joint assembly due to wear of both the ball and the socket. The invention also allows for renewal of the ball joint by allowing for replacement of the polymer bearing. The design includes a retainer/safety nut for preventing accidental separation of the components of the ball joint as a result of such wear.

Ball joints are well known structures that are used in a variety of mechanical linkages. For example, ball joints are commonly used in vehicular steering and suspension assemblies to allow front wheels to turn sideways and also to transmit force between a steering mechanism and a steered wheel of a vehicle. A typical ball joint includes a ball stud that is received within a lubricated socket. The ball stud includes a spherically-shaped head portion having an elongated shaft portion extending therefrom. The spherically-shaped head portion of the ball stud is received within and cooperates with a corresponding spherically-shaped recess formed in the socket. This arrangement positively connects the ball stud to the socket so as to permit some forces to be transmitted therethrough. This arrangement also allows the ball stud to pivot in any direction relative to the socket.

It has been found that after a period of use, the cooperating portions of the ball stud and the socket of the ball joint will experience wear. Such wear can create undesirable looseness between the ball stud and the socket of the ball joint, resulting in the generation of noise and misalignment between the ball stud and the socket. In extreme cases, such wear can contribute to or cause the accidental separation of the ball stud from the socket, resulting in a total failure of the ball joint. Accidental separation of the ball stud from the socket is common in areas with bumpy roads. Unfortunately, because the spherically-shaped head portion of the ball stud is received within the corresponding spherically-shaped recess formed in the socket, it is often difficult to determine how much wear has occurred within the ball joint without removing the ball joint from its application and disassembling the ball stud and the socket for inspection. Such removal and disassembly is time consuming and expensive. In extreme cases, wear of the ball stud from the socket can lead to motor vehicle accidents that are caused by the accidental separation of the ball joints or tie rod ends. Thus, it would be desirable to provide a device that prevents accidental separation of the ball joint as a result of such wear. It would also be desirable to provide a method for renewing the ball joint so as to prolong its service life.

DESCRIPTION

Summary of the Invention

This invention relates to a retainer/safety nut that prevents the separation of the ball stud from the socket as a result of wear of the ball stud or socket. The improved ball joint design includes an additional opening on the socket to accommodate an additional shaft on the other side of the standard ball stud. The additional shaft has threads for fitting of a retainer/safety nut. The retainer/safety nut ensures that the ball does not leave the socket. The retainer nut is bell-shaped so as to allow for sideways movement of the shaft. The side of the socket that has the retainer nut can be closed permanently for example by welding or press-fitting a cap onto the socket or by way of a cap that is screwed into the socket. For the version with a screw-in cap, the cap can be screwed into the socket towards the ball to eliminate free play. After screwing in the cap, the retainer nut must also be adjusted accordingly. The retainer/safety nut and the whole ball joint assembly are protected from dust and natural elements by rubber boots. Various objects and advantages of this invention will become apparent to those skilled in the art from the following detailed description of the preferred embodiments, when read in light of the accompanying drawings.

Figure 1:
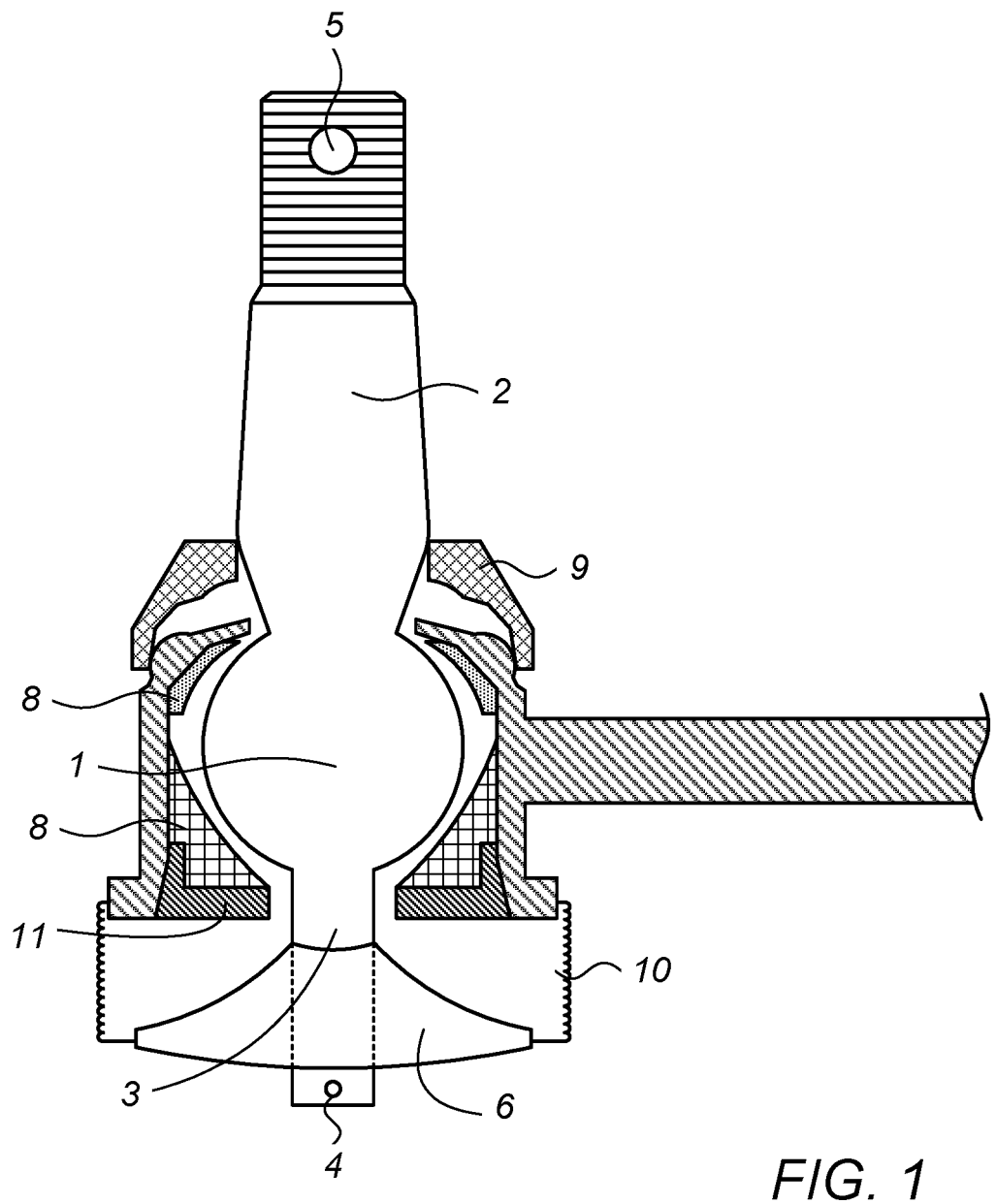
FIG. 1 is a perspective view of a ball joint with a retainer/safety nut and a screw-in cap in accordance with an example this invention.

DESCRIPTIVE KEY 1 ball
2 Main stud
3 auxiliary study for retainer nut
4 hole for cotter/safety pin
5 hole for cotter/safety pin
6 retainer/safety nut
7 socket
8 polymer bearing
9 rubber boot/dust cover
10 rubber boot/dust cover
11 screw-in cap

DETAILED DESCRIPTION OF THE PREFERRED EMBODIMENTS

The invention relates to ball joint assembly having a ball (1) with studs/shafts on both sides of the ball (2 & 3). The main stud/shaft (2) is the same as the stud found in conventional ball joints. The auxiliary stud (3) is shorter than the main stud and is for holding the retainer/safety nut that prevents accidental separation.

Both shafts have holes for cotter/safety pins (4 & 5). The main shaft (2) holds the castle nut as in conventional ball joints.

The retainer nut (6) is bell shaped so as to allow the ball and studs to move in all directions.

The ball (1) and socket (7) function as a typical ball and socket assembly.

A polymer bearing (8) is fitted into the socket. Press fitting of the ball joint assembly or screwing-in of the socket cap ensures that the polymer bearing is tightly packed. The polymer bearing absorbs impact thereby protecting the ball and socket. It also serves to reduce friction between the ball and socket.

When the polymer bearing is worn, some up and down movement in the ball will result. This movement is a sign of wear and can be evidenced by a rattling noise coming from the vehicle suspension. The wear in the ball joint can also be felt by shaking the wheel up and down.

The end of the socket with the retainer nut can either be closed by way of press-fitting a cap or by way of a screw-in cap (11). For the version with a screw-in cap, the cap can be screwed into the socket towards the ball to eliminate free play. After screwing in the cap, the retainer nut must also be adjusted accordingly.

The cap can be unscrewed and removed for the purpose of renewing the ball joint by way of replacing the worn-out polymer bearing using pre-molded replacement polymer bearings. This prolongs the service life of the ball joint.

The ball and socket are protected on both sides by rubber boots (9 & 10). The boots are held firmly in place by rings as in conventional ball joints.

As the ball wears, the ball moves in the direction of the main shaft bringing the retainer nut into contact with the socket, thereby preventing accidental separation of the ball and socket.

Figure 2:
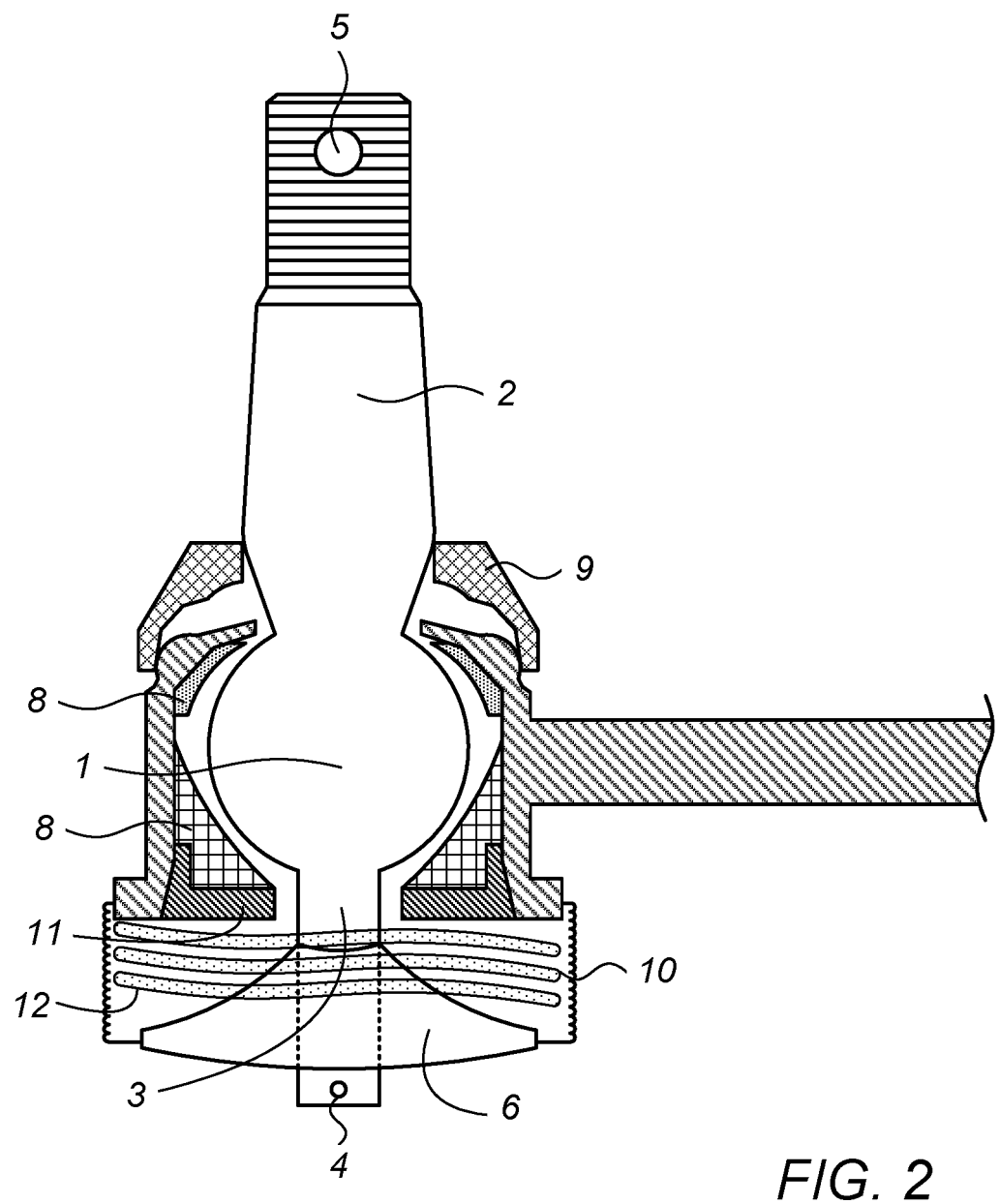
FIG. 2 is a perspective view of a ball joint with a retainer/safety nut and a screw-in cap in accordance with another example of this invention.

A coil spring can be added to this design between the socket and the retainer/safety nut to reduce impact and vibration which may result from wear of the ball and socket (see FIG. 2).

The present invention may be used as a substitute for a conventional ball joint or may be installed in new vehicles. The invention may also be used in other non-motor vehicle applications that require ball joints. The invention can be used on all-steel ball joint that use grease for eliminating friction, as well as on low friction ball joints that use polymer bearings. The invention can also be used with load carrying and non-load carrying ball joints.

The foregoing descriptions of specific embodiments of the present invention have been presented for purposes of illustration and description. They are not intended to be exhaustive or to limit the invention and method of use to the precise forms disclosed.

Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A device for avoiding the accidental separation of a ball and socket in a ball joint assembly and preventing steering and mechanical loss of control on motor vehicles comprising:
    a ball joint assembly having a screw-in type socket, said socket having a first opening and a second opening and a polymer bearing fitted inside said socket;
    a ball disposed in said socket such that said polymer bearing absorbs impact exerted on said ball, said ball having a first and second studs coupled thereto, said first stud protruding from said first opening, and said second stud protruding from said second opening said first and second studs includes a safety hole and cotter pin;
    a bell-shaped retainer coupled to said second stud and having a wide portion larger than said second opening precluding thereby displacement of said ball out of said socket;
    dust covers disposed around said bell-shaped retainer; and
    a coil spring disposed between said socket and said retainer and being configured to reduce impact and vibration exerted on said ball.

2. A device according to claim 1 further comprising a disposed around said second opening and being configured to be screwed into said socket.

3. A device according to claim 2 wherein the second stud has a threaded end configured to be screwed into said bell-shaped retainer and further having a hole for a cotter pin and a safety retainer nut to screw thereon.

4. A device according to claim 3 wherein the bell-shaped retainer is configured to allow for angular movement of the second stud.

5. A device according to claim 4 wherein the polymer bearings are fitted at the upper and lower ends of the socket.

* * * * *